United States Patent [19]
Poirier et al.

[11] 4,005,366
[45] Jan. 25, 1977

[54] SYSTEM TO SIMULATE MOTION AND PLASMA INDUCED SIGNAL VARIATIONS FROM REENTRY VEHICLES

[75] Inventors: Joseph L. Poirier, Chelmsford; David H. Tropea, Brocton, both of Mass.

[73] Assignee: The United States of America as represented by the Secretary of the Air Force, Washington, D.C.

[22] Filed: Aug. 18, 1975

[21] Appl. No.: 605,578

[52] U.S. Cl. .................................. 325/67; 35/12 R
[51] Int. Cl.² ........................................ G09B 9/02
[58] Field of Search ............ 325/67, 133, 134, 363; 324/572; 331/183; 35/1, 12 R, 12 C

[56] References Cited
UNITED STATES PATENTS

| | | | |
|---|---|---|---|
| 3,293,777 | 12/1966 | Shaw et al. ............................. | 35/1 |
| 3,605,022 | 9/1971 | Fillipo et al. ....................... | 325/134 |
| 3,727,137 | 4/1973 | Barron ................................. | 325/67 |

*Primary Examiner*—Benedict V. Safourek
*Attorney, Agent, or Firm*—Joseph E. Rusz; George Fine

[57] ABSTRACT

A system to simulate motion and plasma induced variations in the attenuation of signals transmitted from reentry vehicles uses a controlled attenuator which is programmed to vary the output power of a test transmitter in a way which simulates the variation which would be observed in actual flight. The simulator can be programmed by either an analog wave shaper or a digital driver to control the attenuation characteristics of a voltage control attenuator thus producing signal variations equivalent to those induced by the plasma sheath and motion of the vehicle.

3 Claims, 18 Drawing Figures

SYSTEM TO SIMULATE MOTION AND PLASMA INDUCED SIGNAL VARIATIONS FROM REENTRY VEHICLES

STATEMENT OF GOVERNMENT INTEREST

The invention described herein may be manufactured and used by or for the Government for governmental purposes without the payment of any royalty thereon.

BACKGROUND OF THE INVENTION

The variations in the strength of a signal received at a ground station is most easily described in terms of the composite signal attenuation. This quantity is defined as the variations induced by vehicle spin and plasma effects in the signal radiated from the transmitting antenna as determined by measuring the signal power received on the ground. It is plotted in dB relative to the maximum free space value of the received signal. The slow variations of the received signal with range and antenna reflection losses due to plasma detuning are added as an attenuation bias to obtain the absolute attenuation.

The purpose of the simulator is to produce a signal variation that would be observed in flight. There are typical curves for composite signal attenuation. A high altitude curve (no plasma) can be calculated or measured. Others which represent plasma effects can be computed. The simulator of the present invention effectively duplicates the fast cyclical variations of the composite signal attenuation by using a properly programmed voltage controlled attenuator. The free space propagation losses and the transmitting antenna losses are accounted for with a fixed attenuator.

It is noted that this invention provides a simple way of determining the dynamic properties of a microwave link prior to an actual flight. Heretofore it was necessary to mount an actual payload or mockup on a turntable and driving it at a speed corrsponding to the spin rate of the vehicle. This mechanical system has severe limitations. It cannot be used for fast spinning vehicles and only a few orientations of the payload are possible because of mechanical constraints. In addition, variations due to plasma effects cannot be simulated. The invention solves all these problems.

This invention can be used prior to rocket test flights to determine the dynamic properties of a microwave link in order to discover any deficiencies before an acutal flight. It also gives the ground receiver operators an opportunity to observe "in-flight" signals before a launch.

SUMMARY OF THE INVENTION

The amplitude of a signal received at a ground station from a rocket-borne microwave transmitter depends on the slant range to the vehicle, the instantaneous orientation of the vehicle relative to the ground receiving site, and the condition of the medium immediately surrounding the transmitting antenna. The invention provides a method and system of simulating these variations prior to the rocket test flight so that the dynamic behavior of the microwave link can be determined and the system parameters optimized. The invention uses a controlled attenuator which is programmed to vary the ouput power of a test transmitter in a way which simulates the variation which would be observed in an actual flight. Two systems may be used. An analog system which is suitable for variations of simple cyclical shape and a digital simulator which is much more flexible and can reproduce changes of any complexity.

DETAILED DESCRIPTION OF THE PREFERRED EMBODIMENTS

Figure 1:
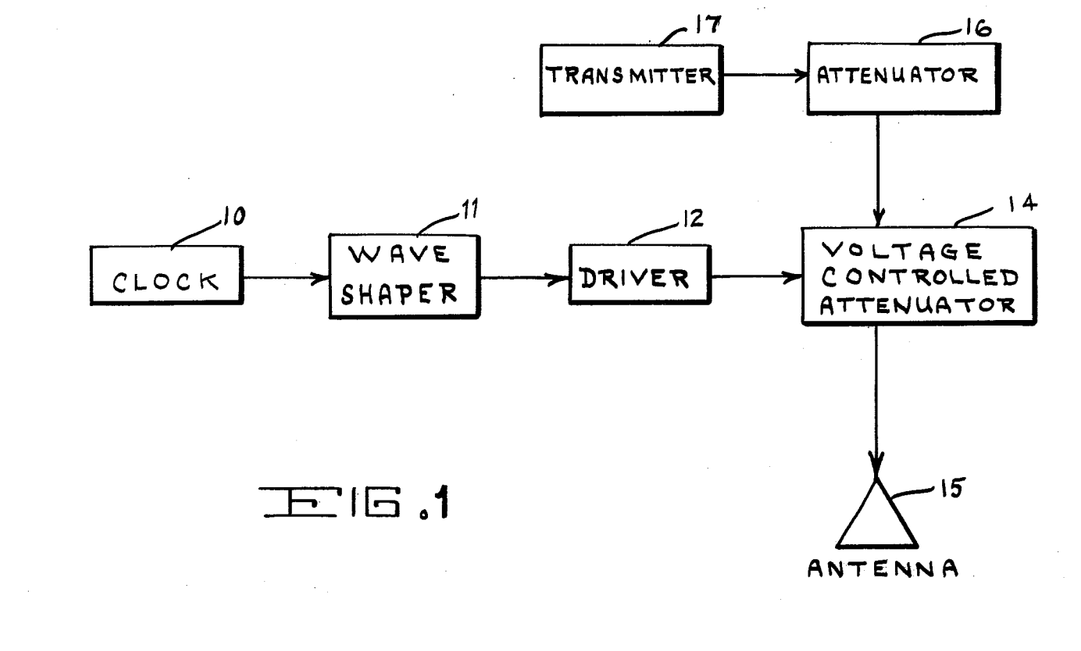
FIG. 1 shows in block diagram form the analog simulator of the invention.
Figure 2A:
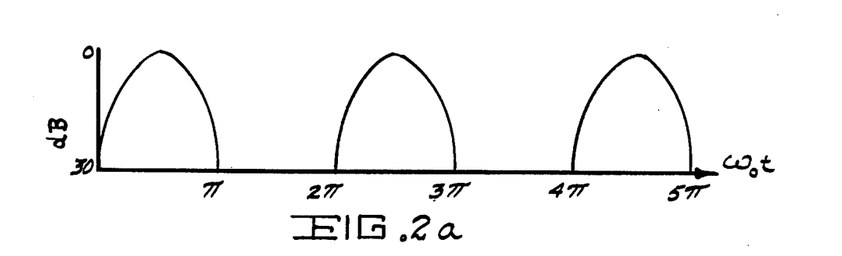
FIGS. 2a–2e show the waveforms associated with the system of FIG. 1.
Figure 2B:
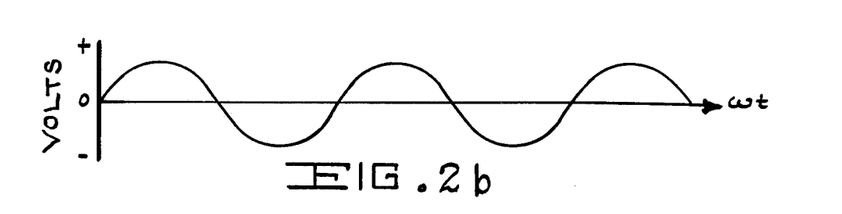
Figure 2C:
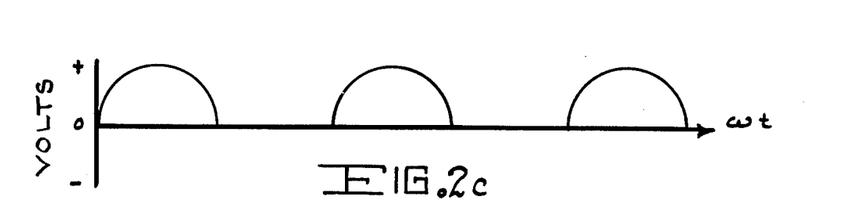
Figure 2D:
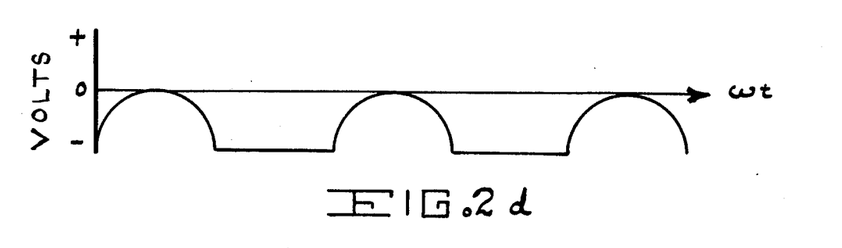
Figure 2E:
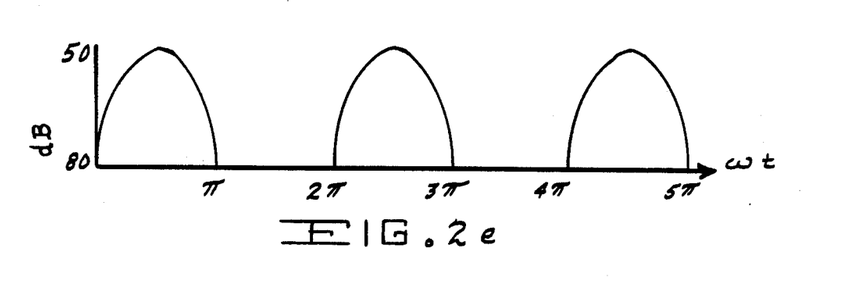

A simplified block diagram of an analog simulator is shown in FIG. 1. Its operation is described in terms of the waveforms of FIGS. 2a – 2e. Curves of this represent the calculated variation in received power (composite signal attenuation) as a function of spin angle $\phi_o$. The frequency of this variation is determined by the spin rate of the vehicle. From clock 10, the frequency of the clock signal, FIG. 2b is adjusted to correspond to the spin rate of the vehicle. Wave shaper 10 modifies this waveform to produce a voltage whose amplitude as a function of time will produce the correct attenuation when applied to voltage controlled attenuator 14 by way of driver 12. This invariably involves introducing amplitude distortion into the wave shaping amplifiers. A typical output is shown in FIG. 2c. The function of driver 12 is to supply any additional wave shaping and to establish the proper bias levels necessary to operate voltage controlled attenuator 14. The output of driver 12, shown in FIG. 2d, controls the instantaneous level of control attenuator 14 and thus the power radiated from antenna 15. The other attenuator 16 receiving a signal from transmitter 17 is set to the attenuation due to range and the average reflection loss of the plasma. The net simulated output is sketched in FIG. 2e and includes the effects of polarization variation with spin.

Figure 3:
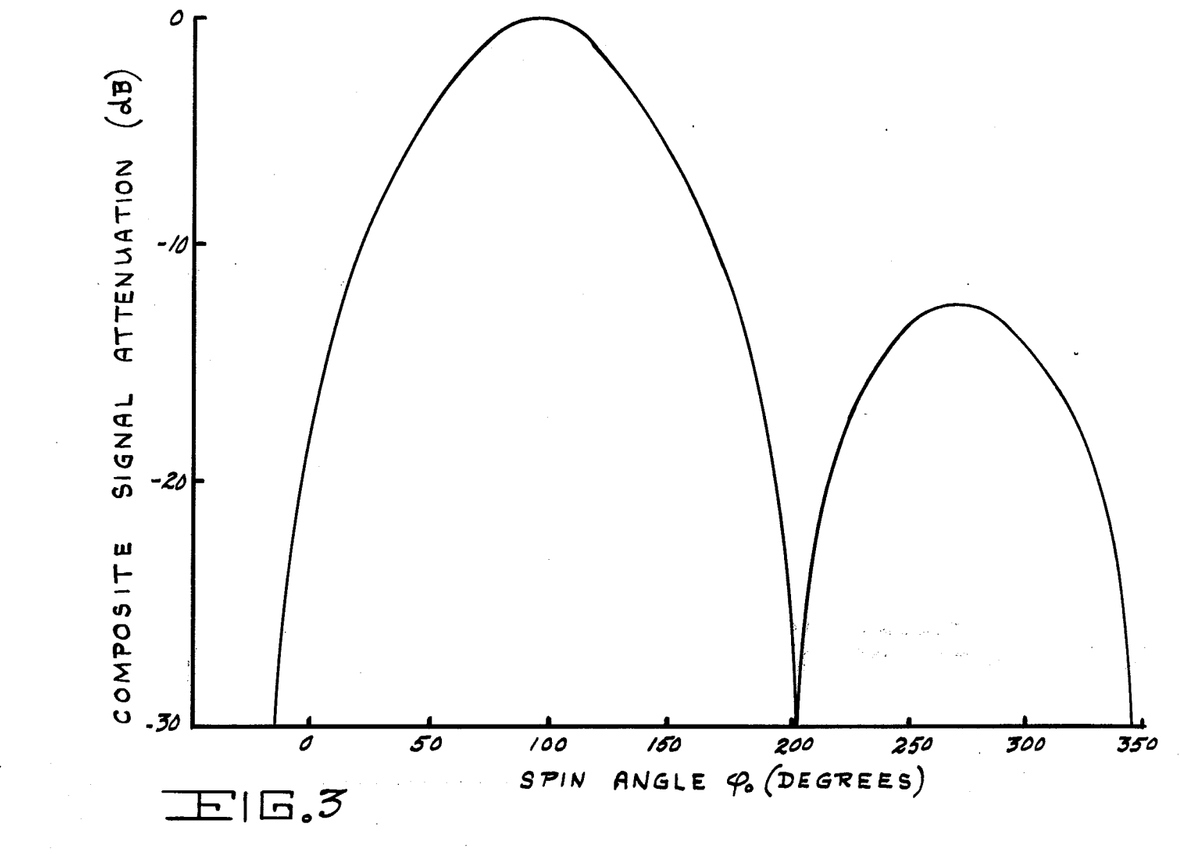
FIG. 3 illustrates a measured pattern.
Figure 4:
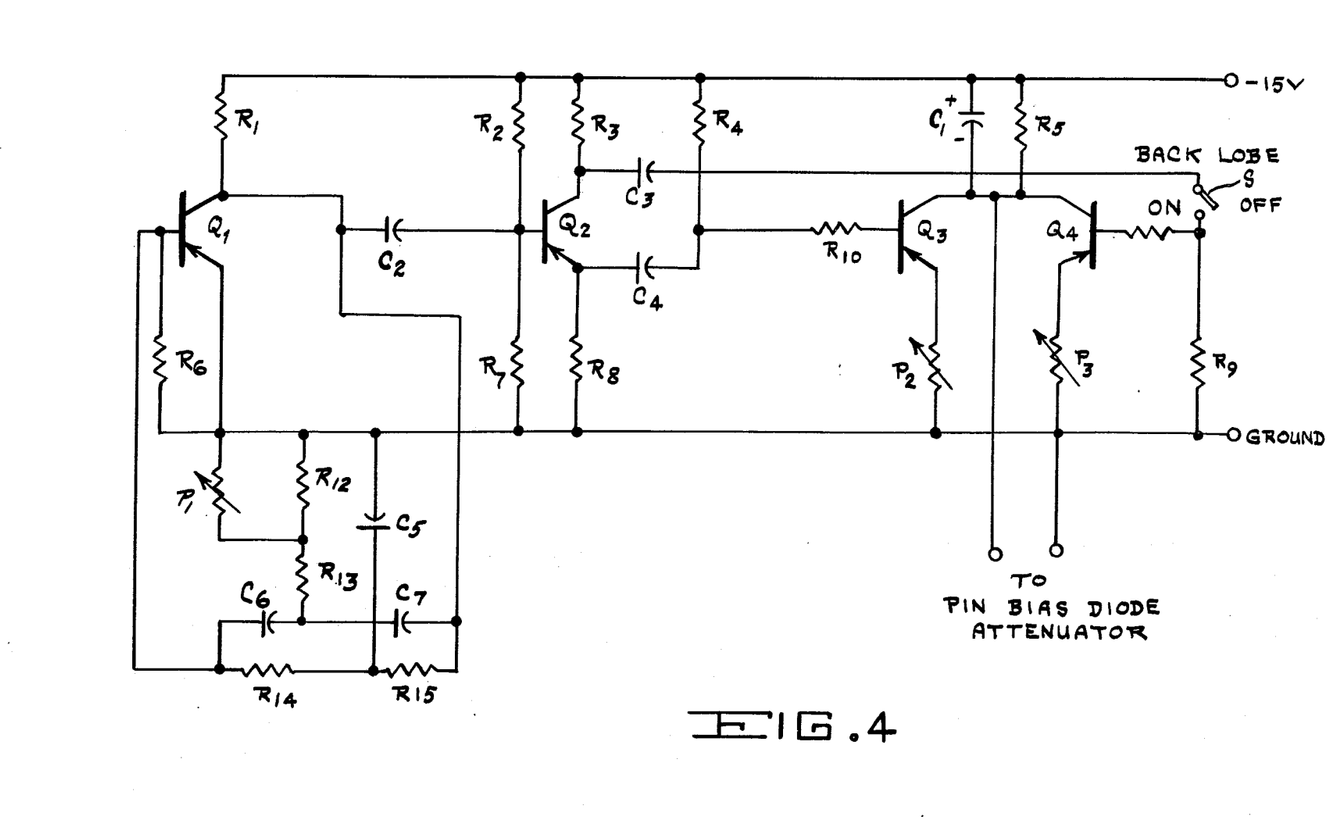
FIG. 4 shows the specific circuit arrangement to simulate the measured pattern of FIG. 3.

The specific circuit arrangement used to simulate the measured pattern of FIG. 3 is shown in FIG. 4 and operates as follows: the circuit associated with transistor $Q_1$ is a twin-tee oscillator which serves as a clock. Its frequency can be adjusted from eight to twelve Hertz to correspond to the vehicle spin rate. The $Q_2$ stage is a phase splitter which provides two clock signals 180° out of phase. One of these will be modified to simulate the front or main lobe of the antenna pattern and the other the back lobe. Inspection of FIG. 3 shows that the main lobe extends for about 220°. The back lobe not only is narrower but also is attenuated more than the front lobe. The bias networks of the $Q_3$ and $Q_4$ driver stages are chosen to produce these characteristics in the output signal. The $Q_3$ stage is biased on and conducts for more than one half of the input signal. This amplifier saturates on the negative peaks and is driven beyond cutoff on the positive peaks. The gain of the stage is controlled by the emitter resistance $P_2$. The collector load of $Q_3$ is common with $Q_4$ and consists of the PIN diode attenuator and the bypassed collector resistor. The bias network values, the stage gain, and the bypass capacitor are chosen to shape the clock signal into a form which produces the desired output attenuation characteristics. The back lobe is produced by the inverted clock signal which is applied to the $Q_4$ base. This stage is biased so that it conducts only for the negative half cycle of the input waveform. Its gain which is lower than the $Q_3$ driver stage is controlled by $P_3$. The output signal of the simulator is shown in FIG. 3.

The specific values in ohms for resistors $R_1 - R_{15}$ are 3.3 K, 75 K, 1 K, 240 K, 2K, 2.2 K, 22 K, 1 K, 220 K, 110 K, 10 K, 3.3 K, 1 K, 47 K, and 47 K, respectively. The values in ohms of potentiometers, $P_1$, $P_2$ and $P_3$ are 5 K, 500, and 500, respectively. The values for capacitors $C_1 - C_7$ are 20 uf, 2 uf, 0.5 uf, 0.5 uf, 2 uf, 1 uf, and 1 uf, respectively. Switch $S_1$ is utilized to provide the aforementioned back lobe when placed in the on position. It is noted that a pin diode attenuator is substituted for attenuator 14 of FIG. 1 and transmitter 17 and attenuator 16 of FIG. 1 are not shown but they are utilized in the same manner with the circuit arrangement of FIG. 4.

Circuit arrangements other than these can be used to obtain similar results or to satisfy specific requirements. But the analog simulation technique just described is only useful in cases where the pattern shape is sufficiently simple so that the modification to the clock voltage waveform needed is not too extensive. Another more flexible form of the simulator is described hereinafter.

Figure 5:
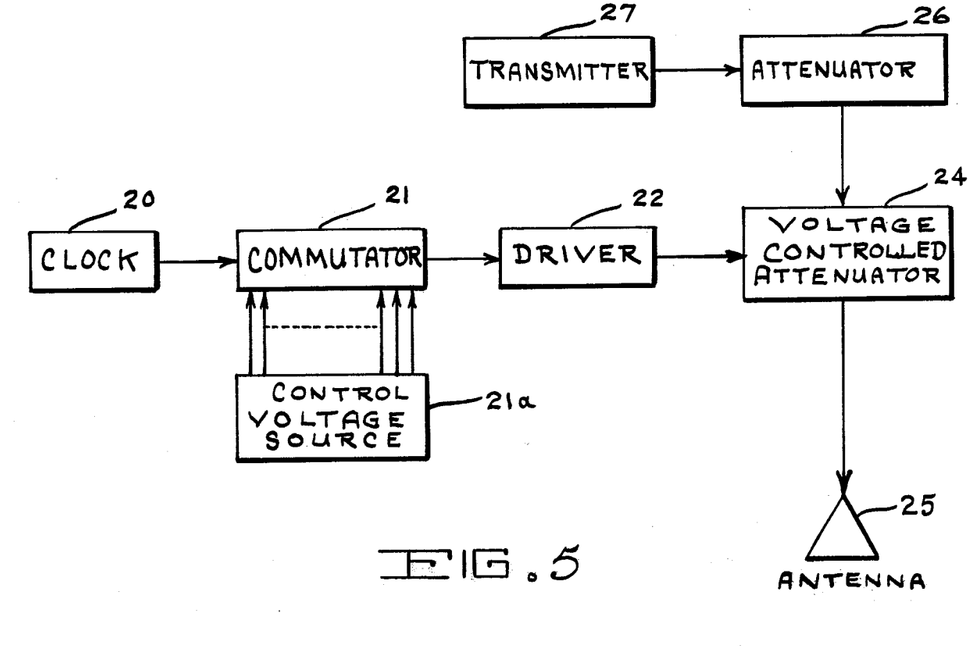
FIG. 5 shows in block diagram form a digital simulator of the present invention.

The block diagram of a digital simulator is shown in FIG. 5. The principal difference between this and the analog simulator is that the wave shaper is replaced by commutator 21 and a set of control voltages from source 21a. Clock 20 instead of supplying the waveform to be modified, now only controls the operation of commutator 21. Commutator 21 electrically operates as a single-pole multiple position switch. It sequentially connects each of its input terminals to its output terminal at a rate determined by clock 20. One complete set of input connections is called a frame and the number of frames per second is the frame rate. The product of the frame rate and the number of positions is the sampling rate which is equal to the clock frequency. Driver 22, voltage controlled attenuator 24, antenna 25, attenuator 26 and transmitter 27 function like driver 12, voltage controlled attenuator 14, antenna 15, attenuator 16 and transmitter 17, respectively, of FIG. 1.

Figure 6A:
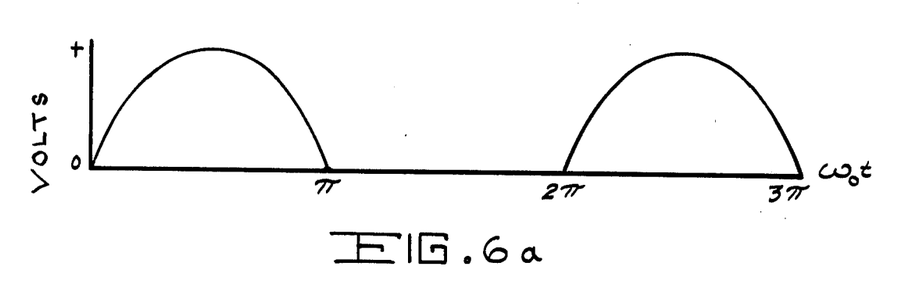
FIGS. 6a–6c illustrate waveforms associated with the system of FIG. 5.
Figure 6B:
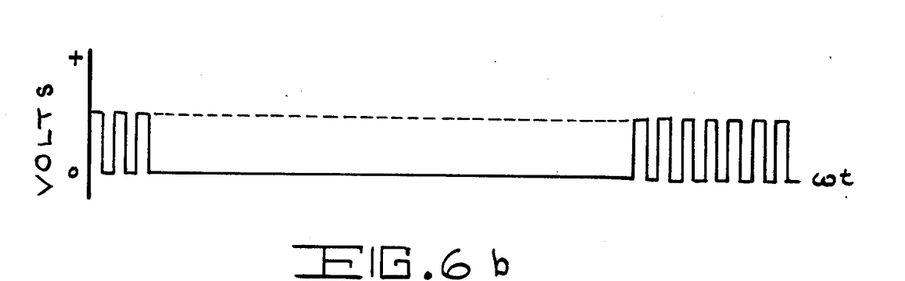
Figure 6C:
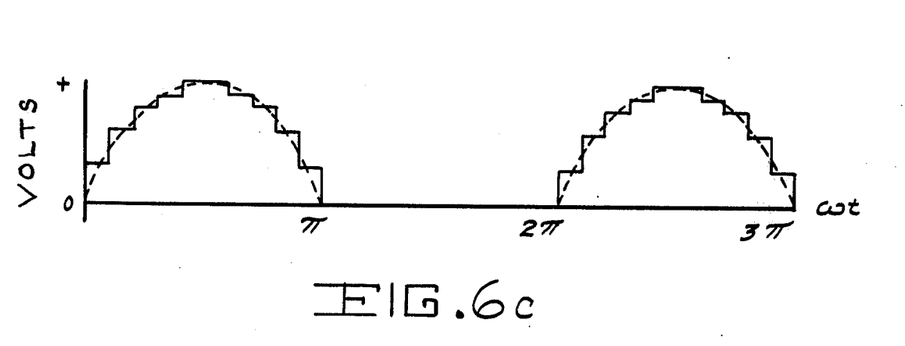

The function of the commutator-voltage source arrangement is to approximate the desired control voltage waveform by a finite number of voltage steps. Let the waveform shown in FIG. 6a represent the desired control voltage waveform. Immediately below this in FIG. 6b is shown the clock waveform. For each cycle of the clock waveform a different voltage source is connected to the output. By adjusting the amplitude of each source to the value corresponding to the selected sample point, the waveform shown in FIG. 6b is generated. In this example, the number of commutator positions is 20 and the frame rate is set to correspond to the spin rate. The attenuation pattern is thus divided into 20 samples each 18° wide.

In a system the desired attenuation pattern variation is obtained either by measurement or by calculation. Then this pattern is divided into a number of samples corresponding to the number of commutator segments. The attenuation at the center of each segment of the pattern is tabulated. The voltage required to produce this attenuation is obtained from the voltage-attenuation characteristic curve of the control-attenuator being used. With these values the voltage sources are set and the resulting attenuation will correspond to the composite signal attenuation pattern.

Figure 7:
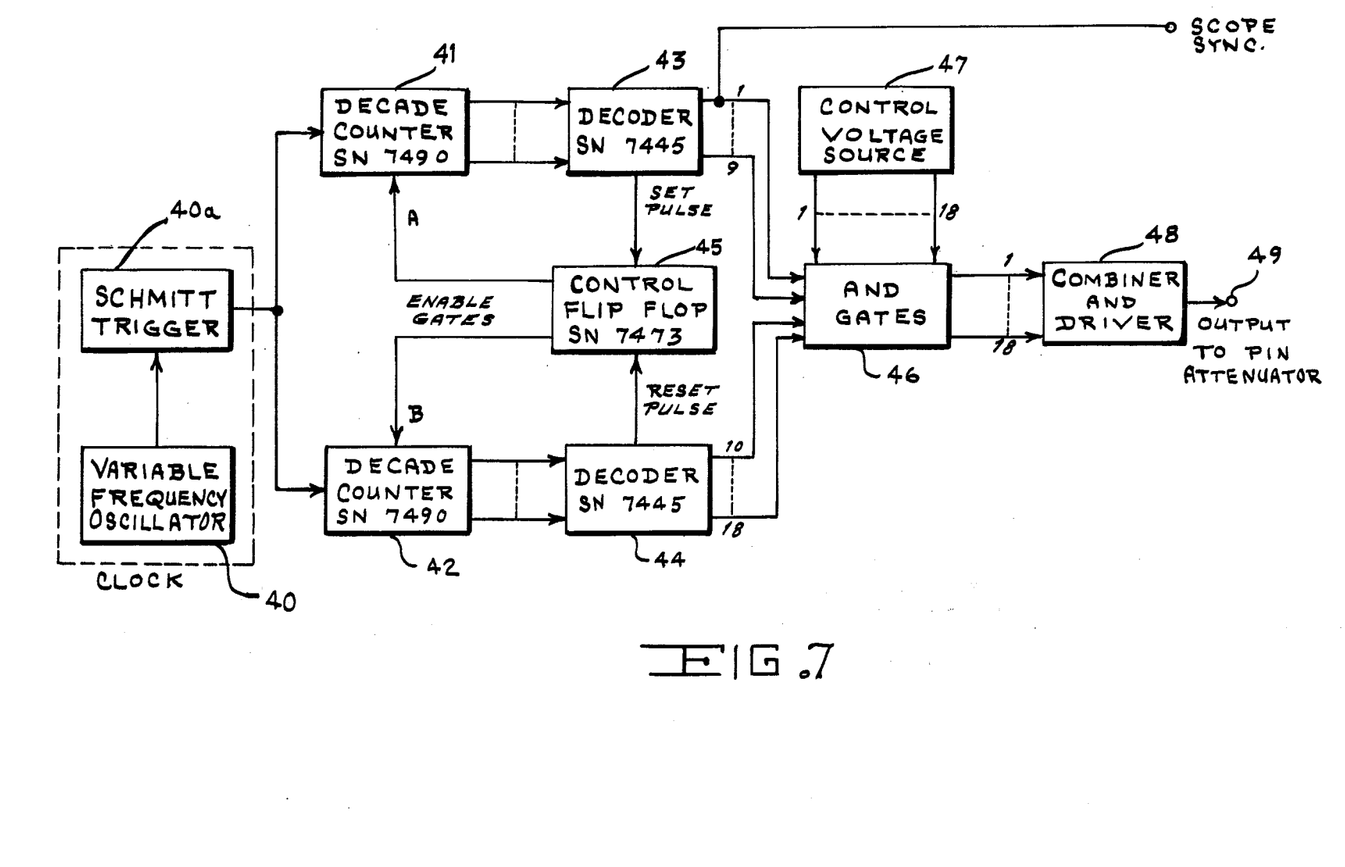
FIG. 7 shows in block diagram form the system to simulate specific antenna patterns such as for the Air Force Trailblazer 11 shoulder antennas.
Figure 8:
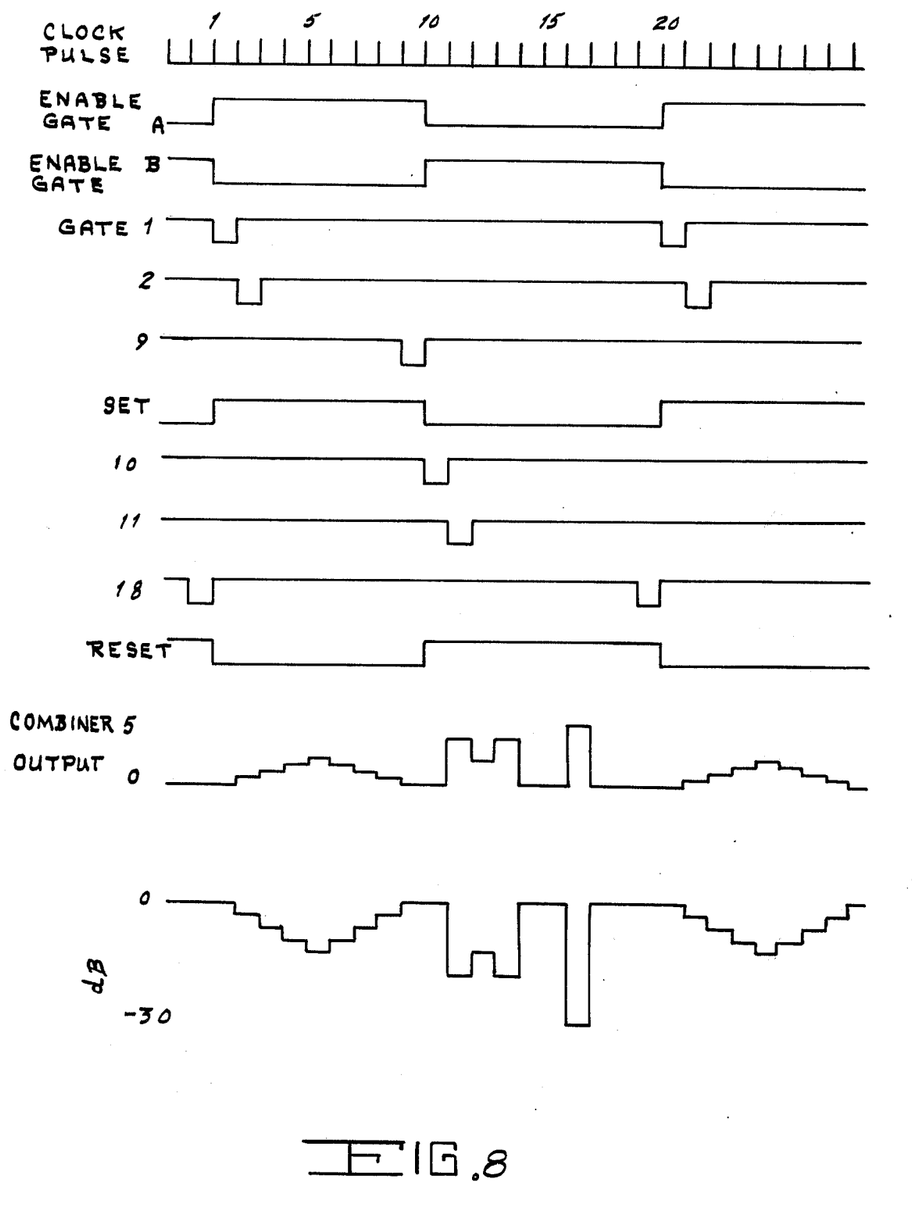
FIG. 8 shows waveforms associated with the system shown in FIG. 7.

A system which was used to simulate the antenna patterns of the Trailblazer 11 shoulder antennas is shown in FIG. 7. The commutator used here had eighteen channels. The clock rate was set to 198 Hz to correspond to an 11 Hz spin rate of the vehicle. The operation of the circuit is more easily understood if the waveforms shown in FIG. 8 are studied along with the diagrams of the simulator. The circuit operates as follows: the clock is variable-frequency sine-wave oscillator 40. Its output is converted by Schmitt trigger 40a into a square wave which is then differentiated to form the train of pulses to be counted. The resulting narrow positive pulses are fed to a pair of integrated circuit (Texas Instruments SN 7490) decade counters 41 and 42.

The counter outputs are then decoded by decoders 43 and 44 to produce ten sequentially occurring gates (+5 to 0 V) at each of the decoder (Texas Instruments SN 7445) outputs. The output of the tenth gate terminal of each decoder (one of these is labeled SET PULSE and the other RESET PULSE) is differentiated and applied to control flip-flop 45 (Texas Instruments SN 7473). The flipflop outputs are then connected back to the decade counters as enable gates. Thus only one of the two decade counter-decoder chains can be counting at a time. As the one which is counting receives its tenth input pulse, the control flip-flop changes state and enables the other counter-decoder. When this counter-decoder receives its tenth pulse, the control flip-flop again changes state and the cycle is repeated. The decoder outputs taken together then consist of a train of eighteen sequentially occurring gates (+5 to 0 V) because two of the outputs, corresponding to input pulses ten and 20 of each group are used to drive the control flip-flop and are not connected to the AND gates. Inspection of FIG. 8 shows that the tenth input pulse to counter chan A corresponds to the first output pulse of counter chain B. After ten more input pulses the converse is true.

Figure 9:
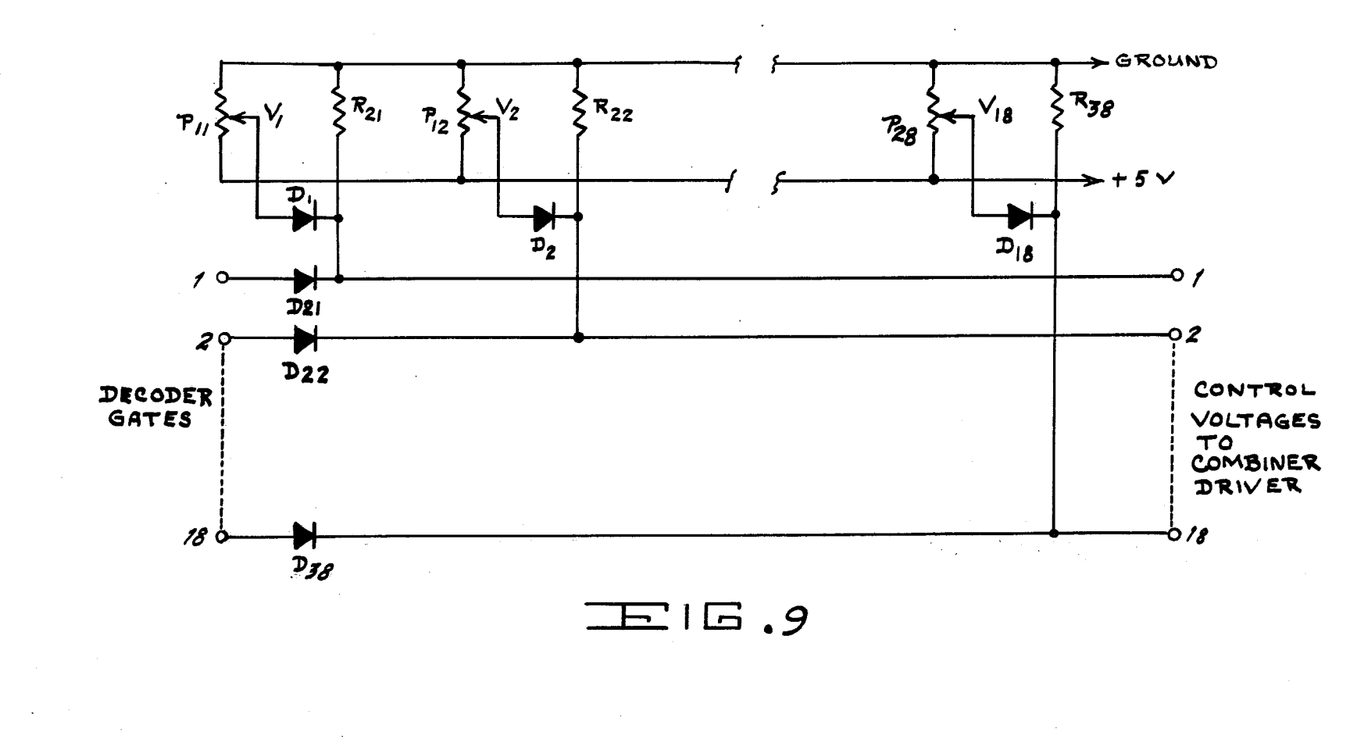
FIG. 9 illustrates in schematic form a circuit diagram of AND gates shown in FIG. 7.

These groups of 18 sequentially occurring gate voltages are now used to drive a set of eighteen AND gates 46 which supply the control voltages from source 47 for the attenuator. The circuit diagram of the AND gates is shown in FIG. 9 and each operates as follows: The control voltage input V is set as required to some value between 0 V and 5 V by adjusting the corresponding potentiometer. For example, $V_1$, $V_2$ ... $V_{18}$ are set by their corresponding potentiometers $P_{11}$, $P_{12}$ ... $P_{28}$, respectively, and the associated diodes are $D_1$, $D_2$ ... $D_{18}$, respectively. $R_{21}$, $R_{22}$ ... $R_{38}$ represent fixed associated resistances, each having a value of 5.1 K ohms. $D_{21}, D_{22} \ldots D_{38}$ are input diodes for the eighteen sequentially occurring gate voltages from the decoders shown in FIG. 7. In the absence of a gate pulse, the gate input is 5 V and its diode is conducting so that the output of the AND gate is also 5 V. When the gate input drops to zero, that diode is backed biased, the control voltage input diode conducts and the output of the circuit becomes equal to the control voltate input. Thus eighteen such AND gates controlled by the sequential gating signals from the decoders produce at their output a set of eighteen control voltages.

Figure 10:
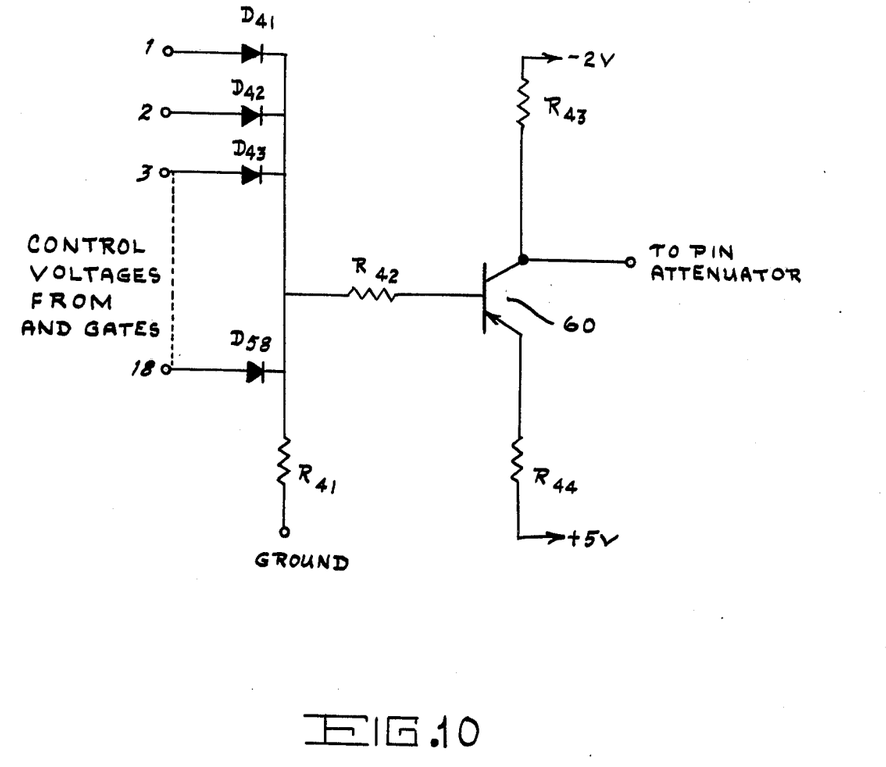
FIG. 10 shows in schematic form a circuit diagram for the combiner-driver of FIG. 7.

There now only remains to combine these separate control voltages so that they appear at a single terminal in sequence. This operation is carried out in combiner-driver stage 48. As shown in FIG. 10 this stage has an eighteen input OR gate at its input, including diodes $D_{41} - D_{58}$ and resistor 41. The driver transistor bias is arranged so that transistor 60 is cutoff for input voltages of 5 V or greater. This condition also produces maximum attenuation in the following PIN attenuator. Control voltages less than 5 V produce correspondingly less attenuation. This behavior is depicted by the last two waveforms of FIG. 8. It is noted that output 49 is fed to a PIN attenuator utilized in place of attenuator 24 of FIG. 5 and there is also included transmitter 27 and attenuator 20 of FIG. 5 and connected in the same relationship.

Figure 11:
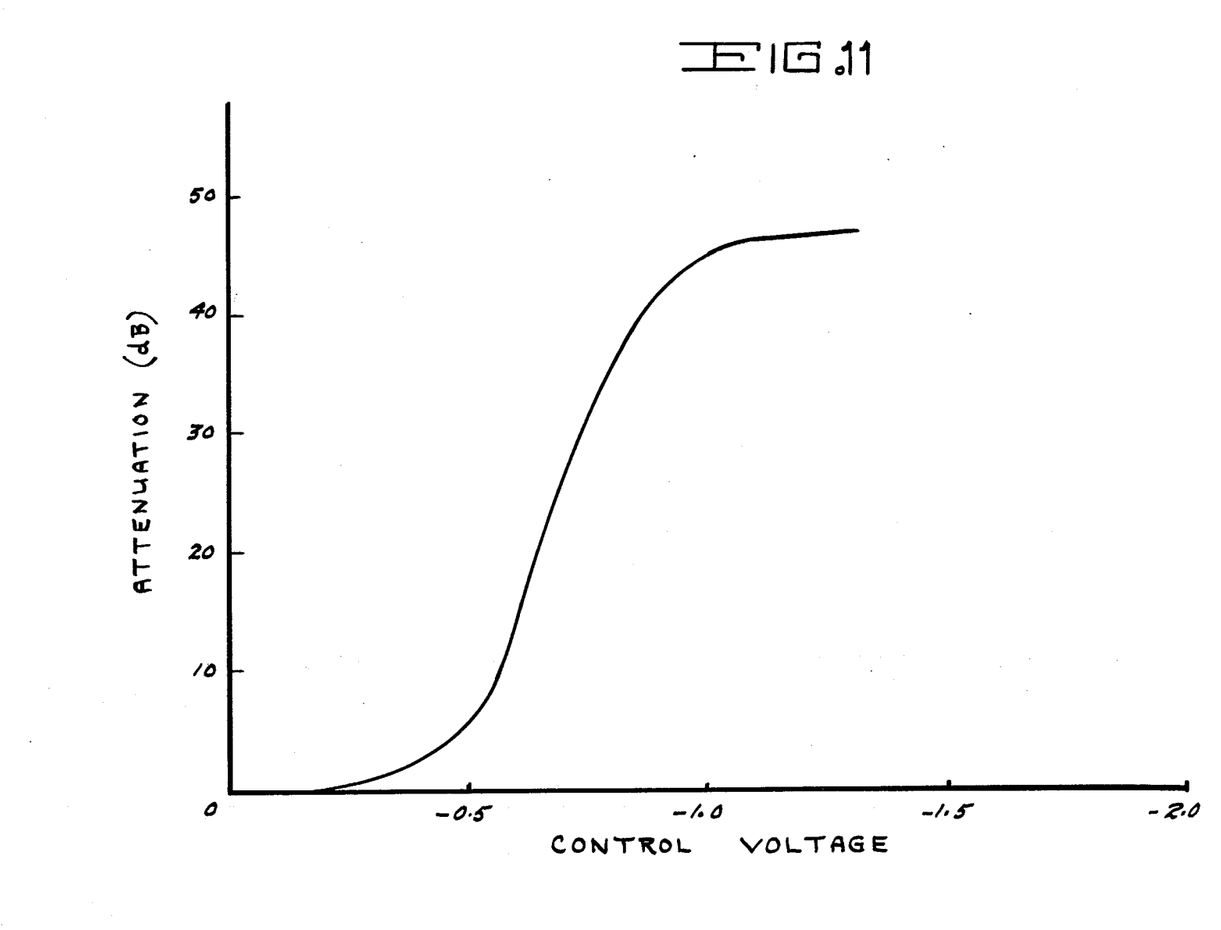
FIG. 11 shows the curve for the pin attenuator utilized at the output of the combiner-driver of FIG. 7 which may also be used for the voltage controlled attenuator of FIG. 5.
Figure 12:
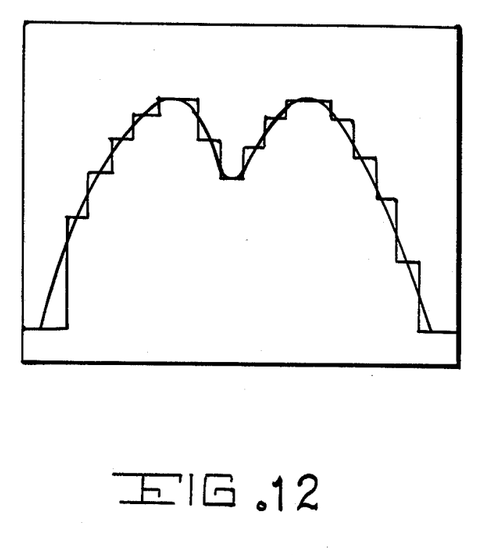
FIG. 12 illustrates a simulated pattern obtained by the technique of using a detector and variable attenuator to calibrate the vertical amplifier of an oscilloscope.

The value for the control voltage of a sample is obtained from the attenuation versus bias curve characteristic of the PIN attenuator being used. The curve for the present attenuator is shown in FIG. 11. A still simpler technique is to use a detector and variable attenuator to calibrate the vertical amplifier of an oscilloscope. The pattern to be simulated is now drawn on the graticule of the oscilloscope. The rf output of the PIN attenuator is monitored with the same detection and the simulated waveform displayed. Now the individual potentiometers are adjusted until the best match between the two patterns is obtained. Using this method, the simulated pattern shown in FIG. 12 which corresponds to that for an altitude of 225 kft was obtained. The superiority of the digital simulator is evident. Any other waveform can be simulated by simply resetting the control voltage potentiometers. The sampling width is also easily reduced by increasing the number of commutator channels.

What is claimed is:

1. A system to simulate motion and plasms induced variations in the attenuation of signals transmitted from a reentry vehicle being comprised of means to generate RF power for transmission, a voltage controlled attenuator having first and second inputs and an output, a transmitting antenna connected to said output of said voltage controlled attenuator, fixed attenuator means interconnecting said means to generate RF power and said first input of said voltage controlled attenuator to provide a predetermined magnitude of RF power to said voltage controlled attenuator to simulate attenuation due to range and average reflection loss due to plasma, clock means providing a predetermined output waveform and having a frequency corresponding to the spin rate of said reentry vehicle, wave shaping means to modify the predetermined clock output waveform to produce a voltage waveform whose amplitude as a function of time duplicates the fast cyclical variations attributable to said reentry vehicle, driver means interconnecting the wave shaping means and said second input of said voltage controlled amplifier to provide additional predetermined wave shaping to include polarization effects and to establish predetermined bias levels to control the instantaneous level of said voltage controlled attenuator and thus the RF power radiated from said transmitting antenna.

2. A system to simulate motion as described in claim 1 wherein said clock means is comprised of a twin-tee oscillator.

3. A system to simulate motion and plasma induced variations in the attenuation of signals transmitted from a reentry vehicle being comprised of means to generate RF power for transmission, a voltage controlled attenuator having first and second inputs and an output, a transmitting antenna connected to said output of said voltage controlled attenuator, fixed attenuator means interconnecting said means to generate RF power and said first input of said voltage controlled amplifier to provide a predetermined magnitude of RF power to said voltage controlled attenuator to simulate attenuation due to range and average reflection loss due to plasma, a commutator-voltage source having input and output terminals, clock means controlling said commutator-voltage source to operate as a single pole multiple position switch sequentially connecting each of said input terminals to each of said output terminals at a rate determined by said clock means thereby approximating a predetermined voltage waveform by a finite number of voltage steps, said predetermined voltage waveform corresponding to a composite signal attenuation pattern from said reentry vehicle, driver means interconnecting said commutator-voltage source and said second input of said voltage controlled attenuator to provide wave shaping to include polarization effects and to establish predetermined bias levels to control the instantaneous level of said voltage controlled attenuator and thus the RF power radiated from said transmitting antenna.

* * * * *